United States Patent [19]

Brennan et al.

[11] Patent Number: 4,489,178

[45] Date of Patent: Dec. 18, 1984

[54] MANNICH CONDENSATES HAVING FIRE RETARDANCY PROPERTIES AND MANUFACTURE OF RIGID POLYURETHANE FOAM THEREWITH

[75] Inventors: Michael E. Brennan; George P. Speranza, both of Austin, Tex.

[73] Assignee: Texaco Inc., White Plains, N.Y.

[21] Appl. No.: 545,422

[22] Filed: Oct. 25, 1983

[51] Int. Cl.$^3$ .................... C08G 18/14; C08G 18/32
[52] U.S. Cl. .................... 521/167; 252/182; 528/73
[58] Field of Search .................... 521/167; 528/73; 252/182

[56] References Cited

U.S. PATENT DOCUMENTS

| | | | |
|---|---|---|---|
| 3,297,597 | 1/1967 | Edwards et al. | 260/2.5 |
| 4,137,265 | 1/1979 | Edwards et al. | 260/570.9 |
| 4,221,875 | 9/1980 | Yukuta et al. | 521/128 |
| 4,258,141 | 3/1981 | Jarre et al. | 521/114 |
| 4,293,657 | 10/1981 | Nissen et al. | 521/121 |
| 4,312,988 | 1/1982 | Jacobs et al. | 544/196 |
| 4,317,889 | 3/1982 | Pcolinsky | 521/107 |
| 4,335,029 | 6/1982 | Dabi et al. | 524/589 |
| 4,369,258 | 1/1983 | Johnson | 521/107 |

*Primary Examiner*—Herbert S. Cockeram
*Attorney, Agent, or Firm*—Jack H. Park; Kenneth R. Priem

[57] ABSTRACT

The invention relates to Mannich condensates of phenol, formaldehyde and diethanolamine in which a minor amount (e.g., less than 1%) of melamine is dissolved subsequent to alkoxylation with propylene oxide or a mixture of propylene oxide and ethylene oxide. The thus-prepared alkoxylated Mannich condensates are then used as all or a part of the polyol component in making a rigid polyurethane foam having improved fire retardancy properties.

15 Claims, No Drawings

MANNICH CONDENSATES HAVING FIRE RETARDANCY PROPERTIES AND MANUFACTURE OF RIGID POLYURETHANE FOAM THEREWITH

BACKGROUND OF THE INVENTION

1. Technical Field of the Invention

This invention relates to the manufacture of rigid polyurethane foam having fire retardancy properties. More particularly, this invention relates to a particular class of propoxylated Mannich Condensates having melamine dissolved therein and to the manufacture of rigid polyurethane foam therewith. The invention is based upon the discovery that melamine is sparingly soluble in a particular class of propoxylated Mannich Condensates and can be dissolved therein to provide modified polyols that can then be used to manufacture rigid polyurethane foams having improved fire retardancy properties.

2. Prior Art

Johnson U.S. Pat. No. 4,369,258 is directed to polyurethane foams prepared by reacting a polyisocyanate with a mixture of a melamine polyol with a polyol derived from a polyester or a polyether polyol.

Yukuta et al. U.S. Pat. No. 4,221,875 is directed to rigid polyurethane foams having flame resistance which are prepared from a mixture comprising a polyhydroxy compound such as an ethylene oxide adduct of a material containing a plurality of hydroxyl groups such as sucrose or sorbitol, an organic polyisocyanate, a blowing agent and powdered melamine. From 20 to 60 parts by weight of powdered melamine per 100 parts of polyhydroxy compound are recommended.

Pcolinsky, Jr. U.S. Pat. No. 4,317,889 and the numerous U.S. patents cited therein disclose the use of melamine derivatives such as hydroxymethyl melamines, melamine phosphate, hexaalkoxymethylmelamine, etc. as components for use in the manufacture of flexible polyurethane foams.

Jacobs et al. U.S. Pat. No. 4,312,988 is directed to the synthesis of hydroxy-terminated melamine derivaties by reacting melamine with isopropanolamine rather than ethanolamine in order to prevent the isomelamine-forming side reactions that can occur when ethanolamine is used. There is no mention in the reference of the use of the hydroxy-terminated melamine derivatives to form polyurethanes.

It is to be noted that none of the above-mentioned references indicate that melamine is soluble in polyols used in the manufacture of polyurethanes. The teachings of the references is to the contrary.

Edwards et al. U.S. Pat. No. 3,297,597 is directed to Mannich condensates of a phenolic compound, formaldehyde, and an alkanolamine which are then alkoxylated, preferably with propylene oxide, to provide polyols useful in the manufacture of rigid polyurethane foams.

Edwards et al. U.S. Pat. No. 4,137,265 is similarly directed to Mannich condensates prepared by reacting nonylphenol with formaldehyde and diethanolamine which are then propoxylated and used in the manufacture of rigid polyurethane foam.

SUMMARY OF THE INVENTION

In one aspect, the present invention is directed to certain propoxylated Mannich Condensates of a phenolic component, formaldehyde and diethanolamine in which melamine has been dissolved in order to provide modified polyols useful in the manufacture of polyurethane foam. The propoxylation component may suitably comprise from 100 to about 90 wt. % of propylene oxide and from 0 to about 10 wt. % of ethylene oxide. The phenolic component may be phenol or an alkyl phenol wherein the alkyl group contains from 1 to 12 carbon atoms.

In another aspect of the present invention, a polyol based upon a Mannich condensate, as just described, which contains dissolved melamine is reacted with an organic polyisocyanate in the presence of a blowing agent, a catalyst, and other appropriate components, in order to manufacture a rigid polyurethane foam having improved fire retardancy properties.

DETAILED DESCRIPTION

The Modified Polyol

The principal components of the modified polyols of the present invention are melamine, a Mannich condensate of a phenol, formaldehyde and diethanolamine and propylene oxide which may be used alone or with a minor amount of ethylene oxide, if desired.

The phenolic compound to be employed in accordance with present invention is phenol or a phenol having a hydrogen atom on one or more of the ring positions ortho and para to the hydroxyl group and which is otherwise unsubstituted or substituted with a C1–C12 straight chain or branched chain alkyl group. Representative compounds include phenol, methylphenol, ethylphenol, propylphenyl, hexylphenol, nonylphenol, dodecylphenol, etc.

The phenolic compound is reacted with formaldehyde and diethanolamine. Formaldehyde may be employed in its conventional form, as an aqueous formalin solution, in "inhibited" methanol solution, as paraformaldehyde, or as trioxane.

For example, the Mannich reaction is conducted by premixing the phenolic compound with a desired amount of the ethanolamine and then slowly adding formaldehyde to the mixture at a temperature below the temperature of Novolak formation (a temperature that will vary with the phenolic compound employed and is a temperature of less than about 45° C. when phenol itself is employed).

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without attempting to isolate the individual components thereof. In fact, in accordance with the preferred embodiment of the present invention, the entire crude Mannich reaction product is used as such.

The propoxylation with or without the use of a minor amount of ethylene oxide is carried out simply by introducing the propylene oxide, preferably under pressure, into a vessel containing the Mannich reaction product. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group and the ethanolamino hydroxyls are reactive with propylene oxide to form hydroxypropyl groups. The final condensation products are purified by removal of unreacted and partially reacted materials by vacuum stripping and are obtained as clear amber to brown liquids having hydroxyl numbers in the range of 400 to 650 viscosities between about 10,000 and 45,000 centipoises at 25° C.

As indicated earlier, it has been discovered that melamine is sparingly soluble in a Mannich condensate as described above. Solubility is normally less than about 1% based on the weight of the polyol.

The melamine is suitably solublized in the Mannich condensate either prior to or subsequent to propoxylation by slurrying from about 0.2 to about 1 mol of melamine per mol of Mannich condensate in the condensate in an agitated autoclave and heating the slurry with agitation, preferably under a mild vacuum of about 10 to about 50 mm of mercury, for a period of time within the range of about 1 to about 10 hours at a temperature within the range of about 100° to about 150° C.

At the end of that time, the slurry is cooled and filtered to remove excess undissolved melamine.

Manufacture of Rigid Polyurethane Foam

The physical components utilized for the manufacture of a rigid polyurethane foam are the polyols, an organic polyisocyanate, a blowing agent, as surfactant, a catalyst and suitable fire retardants and other additives.

The polyol component in the present invention comprises a modified propoxylated Mannich condensate as just described used alone or in admixture with from about 10 to about 60 parts of weight of a polyoxyalkylene polyol having hydroxyl number between 200 and 800, preferably, between 300 and 700 and more preferably between about 400 and about 600, and a functionality of 2 to 6, and preferably from about 3 to 6 wherein the initiator is propoxylated with a propylene oxide component containing 100 to about 90 wt. % of propylene oxide and about 10 to 0 wt. % of ethylene oxide.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with a mixture of propylene oxide and ethylene oxide to achieve a random distribution of such alkylene oxides.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Preferred aromatic polyisocyanates used in the practice of the invention are methylene-bridged polyphenyl of polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Methylene-bridged polyphenyl polyisocyanate mixtures used here may contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

In the production of rigid polyurethane foams in the practice of the invention other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

The catalysts which may be used to make the foams of my invention are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, dimethylpiperazine, N-ethylmorpholine, dimethylaniline, nicotine, dimethylaminoethanol, tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Conventional formulation ingredients are also employed, such as, for example, foam stabilizers also known as silicone oils or emulsifiers. The foam stabilizer may be an organic silane or siloxane. For example, compounds may be used having the formula:

RSi[O-(R SiO)$_n$-(oxyalkylene)$_m$R]$_3$ wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromoneopentyl phosphate, tetrakis(2-chloroethyl)ethylene diphosphate (sold by Olin Chemicals as THERMOLIN ®101), FYROL ® EFF (oligomeric chloroalkyl phosphate, sold by Stauffer Chemical Co.), tricresyl phosphate, cresyl diphenyl phosphate, chlorinated paraffin, and brominated paraffin. Halogenated phosphates are preferred flame retardants in the practice of this invention, especially tris(1,3-dichloropropyl)phosphate, tris(2-chloroethyl)phosphate, FYROL ® EFF, and tetrakis(2-chloroethyl)ethylene diphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range, from about 20 to about 60 parts by weight per 100 parts by weight of polyol in the reaction mixture. It is preferred to use from about 20 to about 40 parts by weight.

The rigid polyurethane foams prepared here can be made in one step by reacting all the ingredients together at once (one-shot process) or the rigid foams can be made by the so-called "quasi-prepolymer method". In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

SPECIFIC EXAMPLES

A. 5474-01

A one-liter three-neck round bottom flask, equipped with a mechanical stirrer, thermometer, vacuum takeoff and a dry ice/acetone cooled trap, was charged with 400.0 g of the aromatic amino polyol described below and 100.0 g (0.79 mol) melamine. The resulting slurry was stirred well under reduced pressure (~25 mm) and heated to 100° C. and held 1.0 hr; then to 125° C. and held 1.0 hr; then to 150° C. and held 2.0 hrs. The melamine appeared to be essentially insoluble in the polyol. After cooling to room temperature, the reaction mixture was filtered and the liquid filtrate was examined analytically for nitrogen incorporation by the usual Kjeldahl procedure. Results follow:

| Polyol | Before Reaction OH No. | Before Reaction % N | After Reaction OH No. | After Reaction % N | % Melamine Soluble |
|---|---|---|---|---|---|
| 1[1] | 455 | 4.20 | 451 | 4.66 | ~0.75 |

[1]A commercial product, Thanol R-650-X polyol manufactured by the Texaco Chemical Company from nonylphenol, formaldehyde and diethanolamine and subsequent propoxylation according to U.S. Pat. Nos. 3,297,597 (Jan. 10, 1967) and 4,137,265 (Jan. 30, 1979).

B. Foam Preparation

A rigid foam was prepared from polyol I and compared to that prepared from the same polyol containing ~0.75% soluble melamine (IM). The formulation components were mixed at 2700 rpm and poured into an 8"×8"×12" open mold and allowed to rise. The resulting foams were allowed to stand at room temperature for 3 days before testing. Formulations and foam physical properties are listed below.

TABLE 1

| (A) Rigid Polyurethane Foam (5474-66) | | |
|---|---|---|
| Formulation, pbw | −1 | −2 |
| Polyol I (OH No. = 455) | 39.4 | — |
| Polyol IM (OH No. = 451) | — | 39.6 |
| Silicone DC-193 | 0.5 | 0.5 |
| Freon R-11B | 13.0 | 13.0 |
| MONDUR MR (index = 1.10) | 47.1 | 46.9 |
| Times (sec.), Mixing | 12 | 12 |
| Cream | 17 | 17 |
| Gel | 57 | 50 |
| Tack Free | 62 | 60 |

TABLE 1-continued

(A) Rigid Polyurethane Foam (5474-66)

| | | |
|---|---|---|
| Rise | 99 | 97 |
| Initial Surface Friability | None | None |
| Foam Appearance | Very Good | Very Good |
| Physical Properties | | |
| Density (lb/ft$^3$) | 2.13 | 2.14 |
| K-Factor | 0.115 | 0.115 |
| Heat Distortion (°C.) | 155 | 158 |
| % Closed Cells | 93.17 | 94.32 |
| Friability (% wt. loss, 10 min.) | 3.47 | 2.98 |
| Butler Chimney Test | | |
| Flame height, in. | >11 | >11 |
| Sec. to extinguish | 36 | 30 |

| Dimensional Stability | | ΔV | ΔW | ΔL | ΔV | ΔW | ΔL |
|---|---|---|---|---|---|---|---|
| 158° F., 100% RH, | 1 wk. | +6.0 | −0.6 | +4.4 | +2.7 | −1.4 | +1.7 |
| 200° F., DRY, | 1 wk. | +8.1 | −0.9 | +4.6 | +4.7 | −1.0 | +2.7 |
| −20° F., DRY, | 1 wk. | −2.2 | +1.1 | −1.5 | −3.7 | −0.4 | −2.2 |
| 158° F., 100% RH, | 4 wks. | +13.4 | −1.8 | +9.0 | +5.3 | −2.1 | +3.3 |
| 200° F., DRY, | 4 wks. | +15.6 | −1.4 | +9.0 | +10.4 | −1.6 | +6.4 |
| −20° F., DRY, | 4 wks. | −2.4 | +1.9 | −2.0 | −5.3 | +4.9 | −2.7 |

The formulation containing the small amount of melamine gives a slightly faster reaction profile and provides a rigid foam with better heat distortion temperatures, less friability, diminished time to extinguish on burning (Bulter Chimney Test) and better high temperature dimensional stability.

C. Incorporation of Soluble Melamine into Aromatic Amino Polyol Mannich Condensates 5474-02

A 1-liter three-neck round bottom flask, equipped with a mechanical stirrer, thermometer, vacuum takeoff and a dry ice/acetone cooled trap, was charged with 450.0 g of 540172 13B (Thanol R-350-X condensate; an equimolar phenol/formaldehyde/diethanolamine, Mannich condensate, water stripped, no propylene oxide) or [5327-12-4], a (Thanol R-650-X condensate 1:2:2 mols monononylphenol/formaldehyde/diethanolamine, Mannich condensate, water stripped, no propylene oxide) and 50.0 g (0.40 mols) melamine. The resulting slurries were stirred well under reduced pressure (~25 mm) and heated to 100° C. and held 1.0 hr.; then to 125° C. and held 1.0 hr.; then to 150° C. and held 2.0 hrs. The melamine appeared to have limited solubility in the Mannich condensates. After cooling to room temperature, the reaction mixtures were filtered and the liquid filtrates were examined analytically for nitrogen incorporation by the usual Kjeldahl procedure. The reactions were also repeated at the 5.0 wt. % melamine level (5474-03) and at this same melamine level in the presence of 2.0 wt. % Davison 979 silica-alumina catalyst (5474-04). Results follow:

TABLE 2

| | OH No. | % N |
|---|---|---|
| R-350-X Condensate | 539 | 6.52 |
| 5474-02A | 644 | 8.57 |
| 5474-03A | 643 | 8.45 |
| 5474-04A | 618 | 3.73* |
| R-650-X Condensate | 456 | 6.04 |
| 5474-02B | 458 | 7.09 |
| 5474-03B | 460 | 7.00 |
| 5474-04B | 456 | 7.20 |

*Analytical result appears to be erroneous

D. Propoxylation of Melamine Modified Mannich Condensates

The modified condensates prepared in Example C were propoxylated (82.5 g or 99.4 ml propylene oxide per g of R-350-X condensate and 51.2 g or 61.6 ml PO per g of R-650-X condensate) at 100°–105° C. in an uncatalyzed reaction by the standard procedure well known to those skilled in the art. The resulting melamine modified aromatic amino polyols analyzed as follows:

TABLE 3

Properties of Melamine Modified Aromatic Amino Polyols

| Precursor (Ex. A) | — | 5474-02-A | -3A | -4A | — | 5474-02B | -03B | -04B |
|---|---|---|---|---|---|---|---|---|
| Aromatic Amino Polyol | R-350-X | 5474-42-1 | -42-2 | -42-3 | R-650-X | 5474-63-1 | -63-2 | -63-3 |
| OH No. | 534 | 547 | 542 | 534 | 455 | 410 | 402 | 418 |
| Total Amine, meq/g | 2.8 | 2.77 | 2.74 | 3.09 | 3.0 | 2.88 | 2.84 | 2.86 |
| % Nitrogen | 3.92 | 4.92 | 4.72 | 4.63 | 4.20 | 4.94 | 4.77 | 4.87 |
| Viscosity (25° C.), cs | 14,500 | 35,025 | 25,336 | 22,493 | 28,000 | 30,438 | 29,892 | 35,710 |
| % H$_2$O | 0.02 | 0.01 | 0.03 | 0.46 | 0.02 | 0.02 | 0.01 | 0.01 |
| Gardner Color | — | 10 | 9–10 | 9–10 | — | 11–12 | 12 | 12 |
| pH (10/1 MeOH/H$_2$O) | 11.2 | 11.8 | 11.7 | 11.8 | 10.6 | 11.1 | 11.3 | 11.4 |

E. Rigid Polyurethane Foams (5474-65 and -73)

Rigid polyurethane foams were prepared from the standard and melamine modified aromatic amino polyols listed in Example D. The formulation components were mixed at 2700 rpm and poured into an 8″ × 8″ × 12′ open mold and allowed to rise. The resulting foams were allowed to stand at room temperature for 3 days before testing. Formulations and foam physical properties are listed below.

TABLE 4

| Formulation, pbw | 5474-35-1 | 65-2 | 65-3 | 65-4 | 65-1 | 73-1 | 73-2 | 73-3 |
|---|---|---|---|---|---|---|---|---|
| R-350-X (O = 534) | 36.0 | — | — | — | — | — | — | — |

TABLE 4-continued

| | 5474-35-1 | 5474-42-1 | | | | | | |
|---|---|---|---|---|---|---|---|---|
| 5474-42-1 (OH = 547) | — | 35.5 | — | — | — | — | — | — |
| -2 (OH = 542) | — | — | 35.7 | — | — | — | — | — |
| -3 (OH = 534) | — | — | — | 36.0 | — | — | — | — |
| R-650-X (OH = 455) | — | — | — | — | 39.4 | — | — | — |
| 5474-63-1 (OH = 410) | — | — | — | — | — | 41.6 | — | — |
| -2 (OH = 402) | — | — | — | — | — | — | 42.1 | — |
| -3 (OH = 418) | — | — | — | — | — | — | — | 41.2 |
| Silicone DC-193 | 0.5 | → | → | → | → | → | → | → |
| Freon R-11B | 13.0 | → | → | → | → | → | → | → |
| MONDUR MR (index = 1.10) | 50.5 | 51.0 | 50.8 | 50.5 | 47.1 | 44.9 | 44.4 | 45.3 |
| Times (sec), Mixing | 15 | 14 | 14 | 14 | 12 | 10 | 10 | 8 |
| Cream | 26 | 19 | 16 | 19 | 17 | 13 | 12 | 11 |
| Gel | 104 | 57 | 51 | 56 | 57 | 31 | 31 | 34 |
| Tack Free | 134 | 62 | 55 | 65 | 62 | 35 | 35 | 36 |
| Rise | 141 | 80 | 95 | 95 | 99 | 62 | 68 | 66 |
| Initial Surface Friability | None | → | → | → | → | → | → | → |
| Foam Appearance | Good | → | → | → | → | → | → | Poor* |

| Physical Properties | 5474-35-1 | 65-2 | 65-3 | 65-4 | 66-1 | 73-1 | 73-2 |
|---|---|---|---|---|---|---|---|
| Density (lb/ft3) | 2.05 | 1.99 | 1.96 | 2.00 | 2.13 | 2.19 | 2.20 |
| K-Factor | 0.122 | 0.113 | 0.111 | 0.111 | 0.115 | 0.116 | 0.114 |
| Comp. Str., with rise | 48.89 | 42.37 | 47.10 | 47.78 | 47.86 | 41.88 | 48.10 |
| against rise | 16.17 | 15.66 | 16.58 | 17.51 | 16.25 | 19.73 | 20.71 |
| Heat Distortion, °C. | 171 | 169 | 175 | 167 | 155 | 159 | 157 |
| % Closed Cells | 92.3 | 91.2 | 92.6 | 92.2 | 93.2 | 95.3 | 94.5 |
| Friability (% wt. loss, 10 min.) | 3.88 | 3.15 | 3.35 | 3.80 | 3.47 | 2.19 | 2.29 |
| ASTM 1692 BURN, in/min (BHA) | 2.124 | 2.598 | 2.820 | 2.580 | 2.970 | 2.682 | 2.480 |

*Foam nonuniform; A ÷ B components incompatible.

Melamine modified R-350-X gave rigid foams with better K-factor and less friability. Melamine modified R-650-X gave rigid foams with a higher heat distortion temperature, less friability and improved burning resistance. In both cases, reaction profiles were considerably faster for the melamine modified polyols.

It will be understood that the foregoing examples are given by way of illustration only and not by way of limitation and that the scope of the present invention is defined solely by the appended claims.

What is claimed is:

1. An alkoxylation product of a Mannich condensate component and alkoxylation component, said alkoxylation product having dissolved therein, as the sole melamine component, a minor amount of melamine, said Mannich condensate having been prepared by reacting 1 to 3 mols of formaldehyde and 1 to 3 mols of diethanolamine with 1 mol of a phenolic component, said phenolic component comprising phenol or a phenol substituted with an alkyl group containing 1 to 12 carbon atoms; the alkoxylation component of the alkoxylation product comprising from 100 to about 90 wt. % of propylene oxide and from 0 to about 10 wt. % of ethylene oxide.

2. An alkoxylation product as in claim 1 wherein the Mannich condensate is a condensate of equimolar amounts of phenol, formaldehyde and diethanolamine, wherein the alkoxylation component consists of propylene oxide and wherein the alkoxylation product has a hydroxyl number of about 500 to about 650.

3. An alkoxylation product as in claim 1 wherein the Mannich condensate is a condensate of nonylphenol, formaldehyde and diethanolamine reacted in the molar ratio of about 2 mols of formaldehyde and about 2 mols of diethanolamine per mol of nonylphenol, wherein the alkoxylation component consists of propylene oxide and wherein said alkoxylation product has a hydroxyl number of about 430 to about 470.

4. A method of preparing a polyol composition which comprises preparing a Mannich condensate of a phenolic component comprising phenol or phenol substituted with an alkyl group containing 1 to 12 carbon atoms by reacting said phenolic component with formaldehyde and diethanolamine in the molar ratio of about 1 to 3 mols of formaldehyde and from about 1 to about 3 mols of diethanolamine per mol of said phenolic component, while removing by-product water of reaction, slurrying from about 1 to about 10 wt. % of melamine with said thus prepared Mannich condensate, heating said slurry at a temperature in the range of about 100° to about 150° C. for about 1 to 6 hours, filtering said slurry to remove undissolved melamine and thereafter reacting the said solution of melamine in said Mannich condensate with from about 20 to about 50 wt. % of an alkylene oxide component comprising from 100 to about 90 wt. % of propylene oxide and from 0 to about 10 wt. % of ethylene oxide.

5. A method as in claim 4 wherein the Mannich condensate is prepared by reacting equimolar amounts of formaldehyde and diethanolamine with phenol.

6. A method as in claim 4 wherein the Mannich condensate is prepared by reacting nonylphenol with formaldehyde and diethanolamine in the ratio of about 2 mols formaldehyde and about 2 mols of diethanolamine per mol of nonylphenol.

7. In a method of preparing a rigid polyurethane foam composition wherein an excess of an aromatic polyisocyanate is reacted with a polyol component in the presence of a catalyst, a blowing agent, a surfactant and a fire retardant;

the improvement for obtaining a rigid polyurethane foam having improved fire retardancy properties which comprises:

utilizing as the polyol component from 100 to about 40 wt. % of an alkoxylated Mannich condensate and, correspondingly, from 0 to about 60 wt. % of a polyoxyalkylene polyl component, said alkoxylated Mannich condensate being a condensate of a phenolic component, formaldehyde and diethanolamine reacted in the mol ratio of about 1 to 3 mols of formaldehyde and about 1 to about 3 mols of diethanolamine per mol of said phenolic component and having been alkoxylated with an alkylene oxide component and having had dissolved therein less than about 1 wt. % of melamine as the sole melamine component, said phenolic component comprising phenol or phenol substituted with an alkyl group containing 1 to 12 carbon atoms, said aklyene oxide component comprising 100 to about 90 wt. % of propylene oxide and 0 to about 10 wt. % of ethylene oxide, said polyoxyalkylene polyl component having been prepared by reacting an initiator having a functionality of about 2 to about 6 with said alkylene oxide component and having a hydroxyl number of about 200 to 800.

8. A method as in claim 7 wherein the sole polyol component is an alkoxylated Mannich condensate of equimolar amounts of phenol, formaldehyde and diethanolamine.

9. A method as in claim 7 wherein the sole polyol component is an alkoxylated Mannich condensate prepared by reacting nonylphenol, formaldehyde and diethanolamine in the mol ratio of about 2 mols of formaldehyde and about 2 mols of diethanolamine per mol of nonylphenol.

10. A method as in claim 7 wherein the alkylene oxide component consists of propylene oxide and wherein the melamine is dissolved in the Mannich condensate subsequent to propoxylation.

11. A method as in claim 7 wherein the alkylene oxide component consists of propylene oxide and wherein the melamine is dissolved in the Mannich condensate prior to propoxylation.

12. In a method of preparing a rigid polyurethane foam composition wherein an excess of an aromatic polyisocyanate is reacted with a polyol component in the presence of a catalyst, a blowing agent, a surfactant and a fire retardant;

the improvement for obtaining a rigid polyurethane foam having improved fire retardancy properties which comprises:

utilizing as the polyol component an alkylene oxide condensate of a Mannich condensate having a hydroxyl number in the range of about 400 to about 650, said Mannich condensate being a condensate of a phenolic component, formaldehyde and diethanolamine reacted in the mol ratio of about 1 to about 3 mols of formaldehyde and about 1 to about 3 mols of diethanolamine per mol of said phenolic component and having dissolved therein less than about 1 wt. % of melamine as the sole malamine component, said phenolic component comprising phenol or a phenol substituted with an alkyl group containing 1 to 12 carbon atoms.

13. A rigid polyurethane foam conposition prepared by reacting an excess of an aromatic polyisocyanate with a polyol component in the presence of a catalyst, a blowing agent, a surfactant and a fire retardant;

said polyol component comprising from 100 to about 40 wt. % of an alkoxylated Mannich condensate component having a hydroxyl number in the range of about 400 to about 650 and, correspondingly, from 0 to about 60 wt. % of a polyoxyalkylene polyol component;

said alkoxylated Mannich condensate component having dissolved therein less than 1 wt. % of melamine as the sole melamine component of said polyol component and having been prepared by alkoxylating said Mannich condensate component with an alkylene oxide component;

said Mannich condensate component being a Mannich condensate of a phenolic component, formaldehyde and diethanolamine reacted in the mol ratio of about 1 to about 3 mols of formaldehyde and about 1 to about 3 mols of diethanolamine per mol of phenolic component;

said phenolic component comprising phenol or a phenol substituted with an alkyl group containing 1 to 12 carbon atoms;

said polyoxyalkylene polyol component having been prepared by reacting an initiator with a functionality of about 2 to about 6 with an alkylene oxide component and having a hydroxyl number of about 200 to about 800;

said alkylene oxide component comprising 100 to about 90 wt. % of propxylene oxide and 0 to about 10 wt. % of ethylene oxide.

14. A rigid polyurethane foam composition as in claim 13 wherein the Mannich condensate is prepared by reacting equimolar amounts of formaldehyde and diethanolamine with phenol, and wherein the alkylene oxide component consists of propylene oxide.

15. A rigid polyurethane foam composition as in claim 13 wherein the Mannich condensate is prepared by reacting nonylphenol with formaldehyde and diethanolamine in the ratio of about 2 mols of formaldehyde and about 2 mols of diethanolamine per mol of nonylphenol and wherein the alkylene oxide component consists of propylene oxide.

* * * * *